I. B. & G. A. SEGERDAHL.
CABLE GRIPPING AND STRETCHING DEVICE.
APPLICATION FILED NOV. 15, 1916.
1,244,136. Patented Oct. 23, 1917.
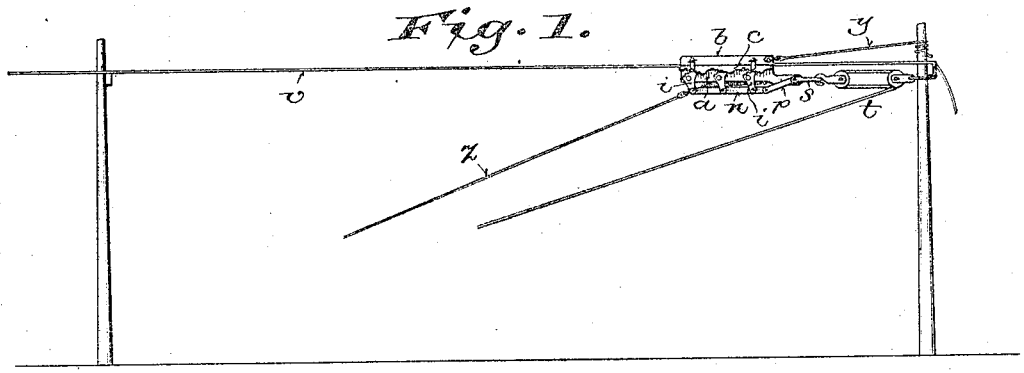
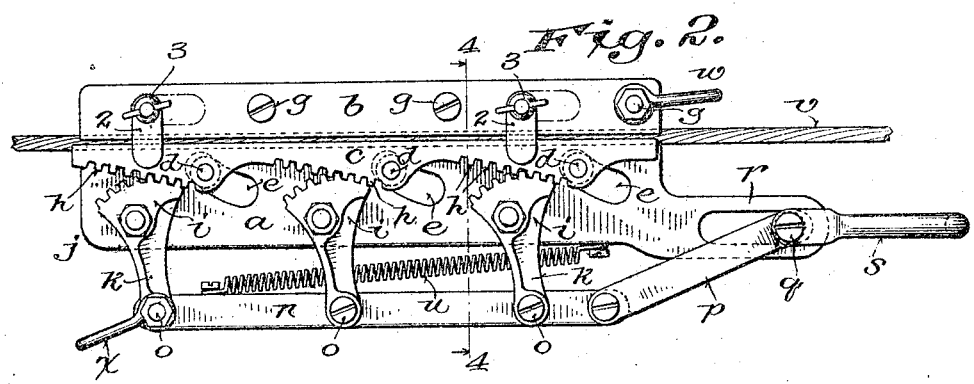
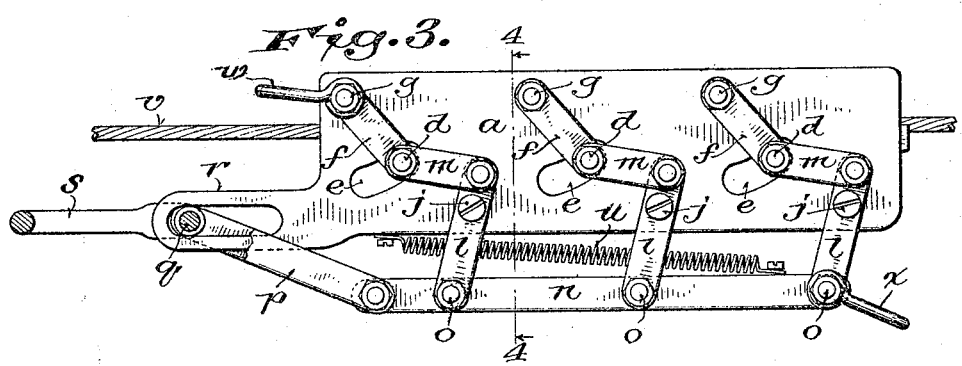
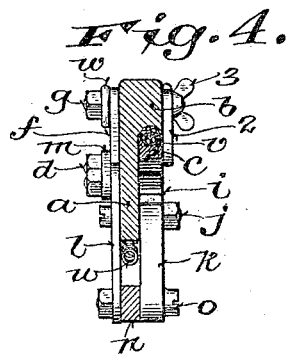

UNITED STATES PATENT OFFICE.

IVER B. SEGERDAHL, OF PRINEVILLE, OREGON, AND GUSTAF ALFRED SEGERDAHL, OF MILWAUKEE, WISCONSIN.

CABLE GRIPPING AND STRETCHING DEVICE.

1,244,136. Specification of Letters Patent. Patented Oct. 23, 1917.

Application filed November 15, 1916. Serial No. 131,363.

*To all whom it may concern:*

Be it known that we, IVER B. SEGERDAHL, and GUSTAF A. SEGERDAHL, citizens of the United States, residing at Prineville, in the county of Crook and State of Oregon, and at Milwaukee, in the county of Milwaukee and State of Wisconsin, respectively, have invented certain new and useful Improvements in Cable Gripping and Stretching Devices, of which the following is a specification, reference being had to the accompanying drawing, forming a part thereof.

This invention relates more particularly to gripping or clamping devices known as "come-alongs" for stretching, holding and fastening elevated cables or wires known as "messenger" cables or wires, for suspending heavy telephone and telegraph cables or the like.

Its main objects are to facilitate stretching and holding such cables or wires preparatory to fastening or "dead-ending" the same; to avoid the danger to linemen incident to these operations when performed according to the usual methods and by the means commonly employed therefor; and generally to improve the construction and operation of devices of this class.

It consists in the construction, arrangement and combination of parts as hereinafter particularly described and pointed out in the claims.

In the accompanying drawing like characters designate the same parts in the several figures.

Figure 1 is a general view on a small scale showing in side elevation a device embodying the invention as applied to a messenger wire or cable in connection with a tackle for stretching the wire or cable and draft lines for separating the jaws and placing the device in position on and removing it from the wire or cable; Fig. 2 is an enlarged front elevation of the gripping device; Fig. 3 is a rear elevation thereof; and Fig. 4 is a vertical cross section on the line 4—4, Figs. 2 and 3.

The gripping and stretching device constituting the present invention comprises a frame plate $a$, provided on one side along or adjacent to its upper edge with a fixed longitudinal jaw $b$, having a concave or grooved gripping face on its under side overhanging the plate. A movable jaw $c$, having a like or similar concave or grooved gripping face, is mounted on said plate below and parallel with the fixed jaw $b$. The movable jaw is provided with studs $d$, projecting from the back side thereof through slots $e$ in the plate and connected by obliquely disposed guiding and supporting links $f$, with the back side of said plate adjacent to its upper edge by pivot bolts or pins $g$, as shown in Figs. 3 and 4.

The movable jaw is formed or provided on the lower side opposite its concave gripping face, with bearings $h$, preferably disposed obliquely to the gripping face of the jaw, as shown in Fig. 2. One or more of these bearings are toothed to engage with eccentrics, as hereinafter explained. As shown, all of the bearings are formed with teeth. Eccentrics $i$, mounted on the front side of the plate $a$ below the jaw $c$, are pivotally connected with the plate by bolts or pins $j$, so as to engage at their peripheries with the bearings $h$, one or more of the eccentrics being formed with teeth. The eccentrics are formed or provided with depending arms $k$.

On the opposite or back side of the plate $a$ levers $l$ are fulcrumed on the bolts or pins $j$. At their upper ends these levers are connected by links $m$ with the studs $d$ of the movable jaw $c$. At their lower ends, which are parallel with one another, the arms $k$ and levers $l$ are connected by a draw bar $n$, which is inserted between and pivotally connected with said arms and levers by bolts or pins $o$. At one end the bar $n$ is connected by links $p$ with a bolt or pin $q$, which is guided in a longitudinally slotted extension $r$ of the plate $a$.

A loop or clevis $s$, pivotally connected with the links $p$ by the bolt or pin $q$ constitutes a draft connection or coupling for a tackle $t$, by which the movable jaw of the gripping device is forced toward the fixed jaw and the cable is stretched, as illustrated in Fig. 1.

A spring $u$, which may be connected at one end with the frame plate $a$ and at the other end with the draw bar $n$, tends to shift the draw bar relative to the frame plate and to swing the eccentric arms $k$ and the levers $l$ in the direction required to move the jaw $c$ toward the jaw $b$ and to produce an initial grip on the cable $v$ between the jaws.

For separating the jaws of the gripping device and for adjusting the device to the desired position on a cable or wire to be stretched, and removing the device therefrom after the cable or wire has been stretched, the frame plate is provided at one end with a loop or clevis $w$, and the draw bar $n$ is provided at the opposite end with a loop or clevis $x$, for the attachment of ropes or draw lines $y$ and $z$, as shown in Fig. 1.

To confine a cable $v$, particularly one of large size, in place between the jaws $b$ and $c$ when they are separated and the gripping device is shifted thereon for adjusting it to the desired position or removing it, keepers 2 are fastened by thumb screws 3 or other suitable means, to the plate $a$ or one of the jaws, as the jaw $b$, so as to project across the opening between the jaws, as shown by full lines in Figs. 2 and 4, or to be turned up as indicated by dotted lines in Fig. 2, into position to permit the removal of the gripping device laterally from the cable. The double operating connections between the movable jaw $c$ and draw bar $n$, comprising the eccentrics $i$ with their arms $k$ and the levers $l$ with the links $m$, located on opposite sides of the frame plate $a$, as shown and described, produce a powerful grip on the cable or wire $v$ to be stretched and held while the free or slack end thereof is fastened, the grip increasing with the increased pull of the tackle $t$ on the draw bar. Such double connections also distribute the draft exerted by the tackle on the movable jaw $c$ in the operation of the device, preventing it and the eccentrics and levers from cramping and binding.

For stretching an elevated cable or wire $v$, strung on poles or other supports, as shown in Fig. 1, the gripping device is placed on the cable or wire by the lineman and then shifted and adjusted thereon to the desired position by manipulation of the ropes or draw lines $y$ and $z$, one held by the lineman on the post or other support, and the other by a helper on the ground. The draw lines $y$ and $z$ being released, the spring $u$ closes the movable jaw $c$ against the under side of the cable $v$, producing an initial grip thereon. The running block of the tackle $t$ being hooked into the clevis $s$, and the standing block being fastened to the pole or other support on which the cable $v$ is strung, the gripping device is drawn toward said pole or support by pulling on the tackle rope from the ground or other convenient location, until the cable or wire is sufficiently stretched. The free or slack end of the cable is then fastened to the pole or other support by the lineman while it is held taut. The jaws $b$ and $c$ are then separated by pulling in opposite directions on the lines $y$ and $z$, thereby releasing their grip on the cable and permitting the device to be drawn by the line $y$ into the reach of the lineman, who can then easily and safely remove it from the cable $v$ without leaving his position on the pole or other support.

By the term "cable" as herein employed it is intended to include any kind of rope, wire or chain which it may be desired to stretch and hold taut for any purpose, such as "dead-ending" or permanently fastening to a pole or other support.

Various changes in the details of construction and arrangement of parts of the device may be made without departing from the principle and scope of the invention as defined in the following claims.

We claim:

1. In a cable gripping and stretching device the combination of a frame plate provided with a longitudinal jaw, a jaw guided and movable on said plate toward and from and parallel with the other jaw and provided on the side opposite its gripping face with a rack, a toothed eccentric pivoted on one side of said frame plate in engagement with said rack and provided with an arm, a lever fulcrumed on the other side of the frame plate and connected by a link with the movable jaw, and a draw bar connected with said arm and lever.

2. In a cable gripping and stretching device the combination of a frame plate provided with a fixed longitudinal jaw, a jaw guided and movable on said plate toward and from the fixed jaw, eccentrics pivoted on said plate in engagement with said movable jaw on the side opposite its gripping face, one of said eccentrics and the movable jaw having interengaging teeth, links connecting the movable jaw with the plate, levers fulcrumed to said plate and connected by links with the movable jaw on the opposite side of the plate from the eccentrics, and a draw bar connected with said arms and levers.

3. In a cable gripping and stretching device the combination of a frame plate provided with a fixed longitudinal jaw, a movable jaw mounted on one side of said plate parallel with the fixed jaw and having bearings opposite and oblique to its gripping face, links connecting the movable jaw with the opposite side of said plate, eccentrics mounted on said plate in engagement with said bearings and provided with arms, one of the eccentrics and its bearing having interengaging teeth, levers fulcrumed on the opposite side of said plate and connected by links with the movable jaw, and a draw bar connected with said arms and levers.

4. In a cable gripping and stretching device the combination of a frame plate provided with a fixed longitudinal jaw, a jaw guided and movable on said plate toward and from and parallel with the fixed jaw, eccentrics mounted on one side of said plate in engagement with the movable jaw and provided with arms, levers fulcrumed on the other side of said plate and connected by links with the movable jaw, a draw bar connected with said arms and links, a draft member guided on and movable lengthwise of said plate and a link connecting the draft member with the draw bar.

5. In a cable gripping and stretching device the combination of a frame plate provided with a fixed longitudinal jaw and adjacent to one end with a draft connection, a jaw guided and movable on said plate toward and from the fixed jaw, eccentrics mounted on one side of said plate in engagement with the movable jaw, levers fulcrumed on the other side of said plate and connected by links with the movable jaw, and a draw bar connected with said eccentrics and levers and provided at opposite ends with draft connections.

6. In a cable gripping and stretching device the combination of a frame plate provided with a fixed longitudinal jaw and adjacent to one end with a draft connection, a jaw guided and movable on said plate toward and from the fixed jaw parallel therewith, eccentrics mounted on one side of said plate in engagement with the movable jaw, levers fulcrumed on the other side of said plate and connected by links with the movable jaw, a spring tending to shift the movable jaw toward the fixed jaw, and a draw bar connected with said eccentrics and levers and provided at opposite ends with draft connections.

7. In a cable gripping and stretching device the combination of a frame plate provided along the upper side with an overhanging fixed longitudinal jaw, a jaw guided and movable on said plate toward and from the fixed jaw parallel therewith, a clear space being left on one side of the device to receive the cable between the jaws when they are separated, keepers fastened to one of the jaws and adjustable into and out of position across the space between them for confining the cable between the gripping faces of the jaws, eccentrics mounted on one side of the plate in engagement with the movable jaw, levers mounted on the opposite side of the plate and connected by links with the movable jaw, and a draw bar connected with the eccentrics and levers.

IVER B. SEGERDAHL.
GUSTAF ALFRED SEGERDAHL.

Copies of this patent may be obtained for five cents each, by addressing the "Commissioner of Patents. Washington, D. C."